March 31, 1970 E. MAYERHOFER 3,504,308

TRAVELING WAVE AMPLIFIER TUBE OF THE HIGHER POWER TYPE WITH A DELAY LINE OF SPACED STRUCTURAL CONFIGURATION

Filed Sept. 29, 1966 3 Sheets-Sheet 1

INVENTOR

Erich Mayerhofer

BY

Spiee & Spiee ATTYS.

INVENTOR
Erich Mayerhofer

BY
Hill & Hill ATTYS.

INVENTOR
*Erich Mayerhofer*

BY *Spiel & Spiel* ATTYS.

United States Patent Office 3,504,308
Patented Mar. 31, 1970

3,504,308

TRAVELING WAVE AMPLIFIER TUBE OF THE HIGHER POWER TYPE WITH A DELAY LINE OF SPACED STRUCTURAL CONFIGURATION

Erich Mayerhofer, Munich, Germany, assignor to Siemens Aktiengesellschaft, Munich, Germany, a corporation of Germany Filed Sept. 29, 1966, Ser. No. 582,982
Claims priority, application Germany, Sept. 29, 1965, S 99,764
Int. Cl. H03h 7/30
U.S. Cl. 333—31 7 Claims

ABSTRACT OF THE DISCLOSURE

A delay line structure for a traveling wave tube comprises a plurality of transverse walls equidistantly spaced apart within a hollow conductor, each of the transverse walls including a coupling opening which is eccentric with respect to the longitudinal axis of the conductor to provide a delay line having a dispersion characteristic which prevents self-oscillation during the time when the line voltage is increasing up to the required operating level.

The invention relates generally to travelling wave amplifier tubes of the power type, and more particularly to an improved delay line of spaced structural configuration for such a travelling wave tube, which is operated such that the basic wave of the tube is backward travelling along the delay line and, wherein the tube is provided with localized damping structures for the suppression of interference-oscillations.

With regard to travelling wave amplifier tubes, it is usual to employ a delay line with a forward travelling basic wave in order to obtain optimum coupling between the high frequency energy carried by the delay line and the electron beam. However, for travelling wave tubes of high power, the thermal capacity of the known wide band delay lines with a forward travelling basic wave, in particular of a helical delay line, is not sufficient to resist the heating of the line caused by electron bombardment thereon. In contrast to this, a delay line which consists of a series of resonators coupled with one another is sufficiently thermally stable for travelling wave power tubes, as is explained in an article in "Electronic Review" Nov. 1, 1963, on page 34, right column. The basic wave of such lines is backward travelling. Therefore, the first forward travelling partial wave is used for an amplifier operation. With regard to this, it is known from the German published application 1,128,924 that through suitable proportioning of the coupling openings through which the individual resonators are coupled with one another, a dispersion characteristic of the delay line may be obtained which enables wide band amplification.

However, travelling wave tubes with a delay line in which the basic wave (most rapid partial wave) is backward travelling, tend, in the vicinity of the lower limit frequency, very strongly to self oscillation. Beyond this point, during an increase of the line voltage, the existence of the individual partial waves may lead to the stimulation and occurrence of interference oscillations in the vicinity of the limit frequencies of the respective passage bands of the delay line. In order to avoid interference oscillations occurring as a result of self oscillations, the delay line is, as is a well known feature, provided with localized damping. However, it is very difficult to always adjust the delay line to the required damping for those frequencies where strong electric fields occur to such a degree that the initiation of interference oscillations is eliminated from the beginning. In addition, the high frequency energy occurring because of adjustment errors has to be absorbed by the localized damping structures. Therefore, there is the danger that the localized damping structure can be charged so strongly that it can be destroyed.

It is the purpose of the present invention to proportion a delay line with backward travelling basic wave for travelling wave power tubes in such a manner that during the time when the line voltage is increased up to the operating voltage the conditions which produce self oscillation are not obtained. In order to produce such a result in a travelling wave amplifier tube of the kind mentioned hereinabove, it is proposed according to the present invention to utilize a delay line with such a dispersion characteristic for the first forward travelling partial wave that the delay proportion increases first in the immediate vicinity of the lower limit frequency, is subsequently higher than that for the lower limit frequency in the operating wave range with a phase rotation of the first forward travelling partial wave of essentially $1.05\pi$ to $1.15\pi$ at small dispersion and finally decreases towards the upper limit frequency to a value which is at the most equal to the delay proportion of the lower limit frequency so that interference oscillations with an intensity which lead to an overcharging of the localized damping are avoided with regard to the values of the line voltage which are below the operating voltage of the line.

The essential advantage of a travelling wave amplifier tube according to the present invention resides in the feature that when the operating value of the line voltage is turned on, the resonance points of the basic wave and of the forward travelling first partial wave at the lower limit frequency ($\pi$-resonance) and of the forward travelling as well as backward travelling first partial wave in the range of the upper limit frequency ($2\pi$-resonance), which are especially crucial for a self-oscillation, are not exceeded. As already mentioned introductorily, in this case a delay line which consists of a hollow conductor inside of which are mounted a plurality of transverse walls, equal to one another and spaced to longitudinal direction at equal distances from one another, which transverse walls include respectively at least one coupling opening, eccentric with respect to the hollow conductor axis, is a very thermally steady line. When using such a delay line, one obtains the required dispersion behavior of the first forward travelling partial wave according to the present invention by the feature that the diameter of the hollow conductor has a value of approximately 0.3 to 0.45, in particular 0.38 to 0.39, of the average operating wave length and that the resonance wave length of the longest wave oscillation-mode of a hollow space limited by two adjacent transverse walls is in relation to the resonance wave length of all of the coupling openings present in one transverse wall and these, in their turn, are in relation to the average operating wave length at a ratio of 1:1.6 ±0.25:2. In this case, the specified proportioning rule for the diameter of the hollow conductor dictates that the upper limit frequency of the wave type with the longest wave lies so high that at this limit frequency, the delay proportion is at the most equal to the delay proportion at the lower limit frequency. The second condition, that is to say that for the resonance wave length of the coupling openings, is responsible for the feature that the delay proportion of the first forward travelling partial wave in the operating wave range at small dispersion is considerably higher than at the two limit frequencies.

The average operating wave length of a hollow conductor delay line, proportioned according to the invention, provided with transverse walls, is preferably essentially chosen to be equal to one half of the lower limit wave length of the first passage range. Furthermore, it is recommendable to provide the coupling openings in the transverse walls of the described delay line in the shape of a bent slit. In this case, the double average slit length corresponds to the resonance wave length of the coupling opening. On the premise of the above mentioned condition that the operating wave length is approximately at the double lower limit wave length, the average slit length of the coupling opening then amount to approximately 0.35 to 0.45 of the average operating wave length.

The occurrence of interference oscillations in a travelling wave tube with a delay line which consists of resonators coupled one with another may, on principle, also be based upon the feature that a stimulation occurs of the higher frequency oscillation modes which are the wavetypes with the longest wave length. However, when utilizing a line proportioned according to the present invention, the danger of the stimulation of such interference modes is essentially reduced by the feature that because of the comparatively small inner diameter of the individual resonator chambers, higher frequency oscillation modes have very small resonance wave lengths. Since the coupling resistance is proportional to the square of the wave length, this dictates a small coupling for the mentioned interference modes. In addition, as another feature of the present invention, it is proposed that the ratio of the inner diameter of the resonator chambers to their height has a value between $\sqrt{1.2}$ and 10. This measure effects the shifting of certain passage ranges of the line, in particular of the range based upon the $H_{111}$ oscillation form, to higher frequencies.

The invention, however, will be more fully realized and understood from the following detailed description when taken in conjunction with the accompanying drawings, wherein.

Like reference numerals throughout the various views of the drawings are intended to designate the same or similar structures.

Figure 1:
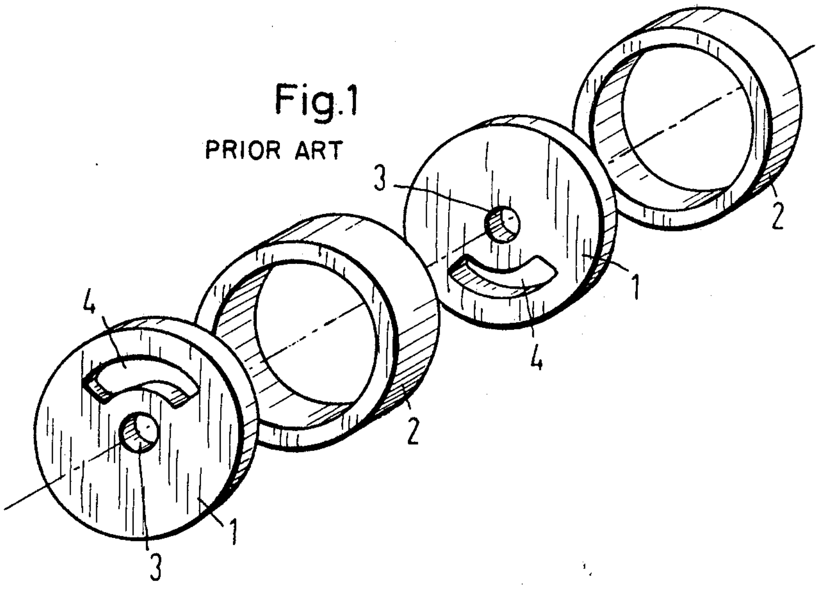
Fig.1 PRIOR ART
FIGURE 1 is an exploded perspective view of a delay line.

With reference to the drawings in detail, and in particular to FIGURE 1, there is shown a delay line which generally includes a plurality of individual disks 1 and a plurality of rings 2 which, in assembled relation, are soldered to one another in alternate succession. In assembled relation, the disks 1 and the rings 2 form resonance chambers between alternate ones of the disk 1. An opening 3 is provided in each of the disks 1 at a center thereof for the passage of an electron beam along the longitudinal axis of the delay line. Furthermore, the disks 1 are provided with arc-shaped openings 4 to which the resonance chambers formed between the individual disks 1 are electromagnetically coupled with one another.

Figure 2:
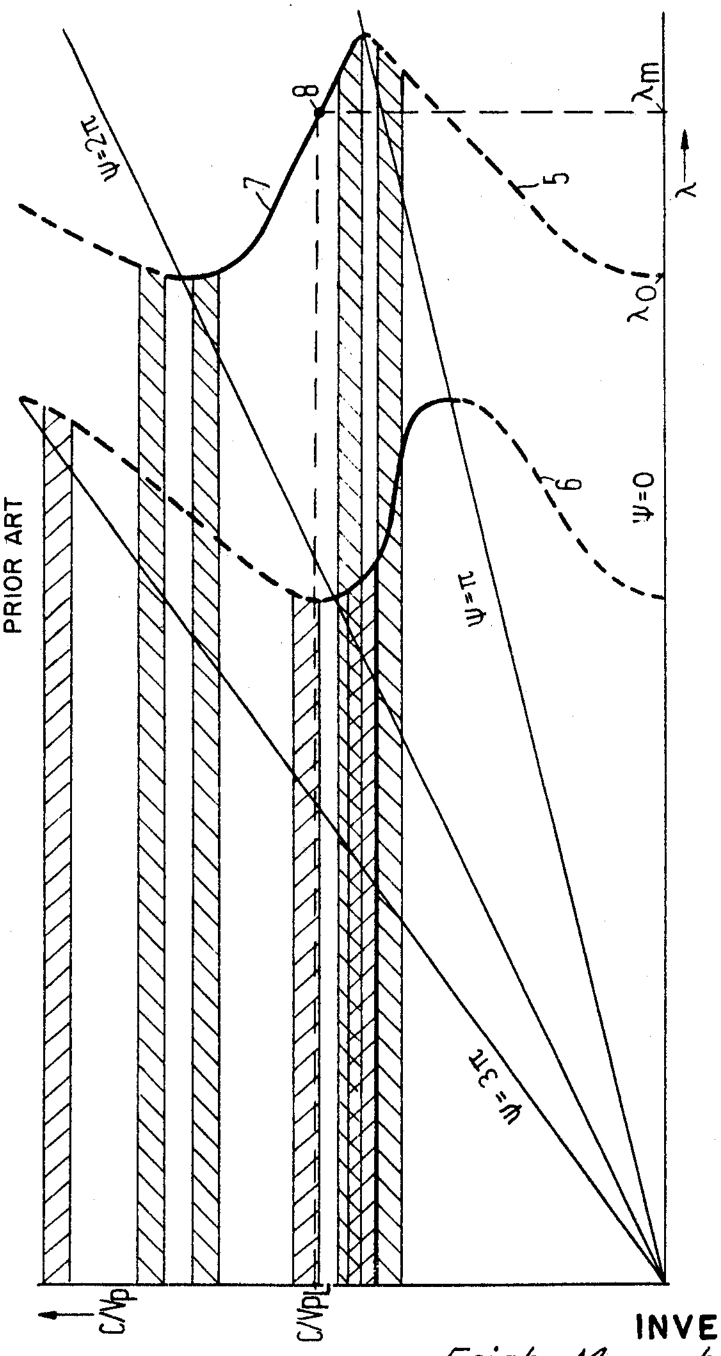
Fig. 2 PRIOR ART
FIGURE 2 is a plot of the dispersion behavior of the delay line illustrated in FIGURE 1.

The delay line illustrated in FIGURE 1 has a dispersion behavior such as that illustrated in the plot of FIGURE 2. The abscissa of the plot designates the wavelength $\lambda$ while the ordinate designates the delay proportion $c/v_p$. The individual straight lines $\psi=n\pi(n=0, 1, 2 \ldots)$ represent the phase rotation of an electromagnetic wave in the hollow conductor between two adjacent transverse walls or disks 1. The curve 5 represents the dispersion characteristic of the basic wave mode with the longest wave length (first passage range), and the curve 6 represents the dispersion of the $EH_{11}$ wave forming the second passage range, in which case, the appropriate partial waves are likewise respectively entered between the straight lines $\psi=n\pi$. For reasons of a high frequency coupling which is as good as possible, the first forward travelling partial wave of the first passage range will be utilized for an amplifier operation. This partial wave has a dispersion corresponding to and represented by the curve 7 with an average operating point 8 at which the phase rotation of the first forward travelling partial wave remains within permissible limits. The operating point 8 corresponds to a certain delay proportion $c/v_{pL}$ to which, in its turn, a certain line voltage is assigned. The turning on of this line voltage dictates that on the ordinate of the diagram of FIGURE 2, all higher values of the delay proportion $c/v_p$ are run through from top to bottom until the delay proportion $c/v_{pL}$ corresponding to the operating point is reached. In this case, above the operating point 8 a reciprocal effect between the electron beam and the electric fields carried by the delay line would be possible, in principle, with regard to all partial waves of the different line modes. However, the most dangerous are only those ranges shown by the hatched areas in the diagram of FIGURE 2 which fall in the vicinity of the limit frequency of partial waves of low order which, as is well known, solely couple sufficiently with the electron beam to involve consideration. That is to say, because of resonance excesses which are caused by inevitable adjustment errors, electric fields of such strength exist in these ranges such that the reciprocal effect of the electron beam with a forward travelling partial wave may cause a so called forward wave stimulation and with a backward travelling partial wave a so-called backward wave stimulation. Generally the stimulation of corresponding interference oscillations may not be completely avoided by means of localized damping.

Figure 3:
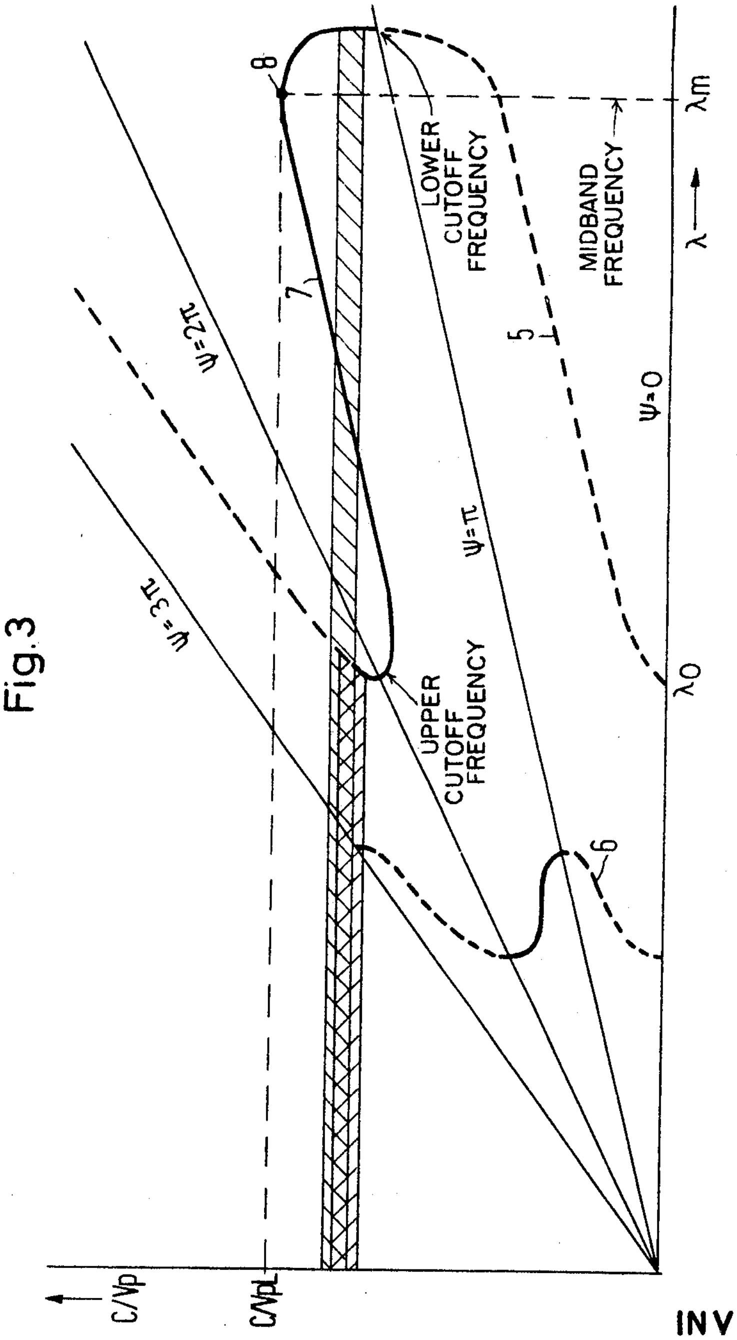
FIGURE 3 is a plot of the dispersion behavior of the delay line dimensioned and constructed in accordance with the principles of the present invention.

The described danger of the stimulation of interference oscillations does not occur in a travelling wave amplifier tube if according to the invention a delay line is used which has a dispersion behavior according to the diagram of the FIGURE 3. The diagram illustrated in FIGURE 3 contains the same representations on the abscissa and ordinate as those of FIGURE 2. In contrast to the diagram of FIGURE 2, the first passage range is considerably broadened through shifting of the upper limit frequency to a higher frequency. First of all, this measure results in the feature that the electron beam does not couple strongly with the waves carried by the line in the vicinity of the straight line $\psi=2\pi$ at nominal current, because the coupling resistance is proportional to the square of the wavelength and consequently decreases considerably along with a frequency increase. Beyond this, the increase of the upper limit frequency results in the feature that a smaller delay proportion than that in FIGURE 2 corresponds to this limit frequency. In this case, the value of the delay proportion is supposed to be at most equal to the delay proportion at the lower limit frequency ($\pi$-resonance). Simultaneously, the dispersion characteristic of the first forward travelling partial wave is selected in such a manner that the delay proportion increases first of all strongly in the vicinity of the lower limit frequency and is only then considerably higher than that at the lower limit frequency at small dispersion in the range of the average operating point 8. From the ranges drawn in the hatched areas, it is evident that the crucial stimulation ranges exist at higher voltages of the delay line than the operating voltage corresponding to the point 8.

In order to obtain the desired dispersion characteristic of the first forward travelling partial wave, explained by means of FIGURE 3, in a delay line according to FIGURE 1, the following dimension rules have to be observed: The upper limit frequency is determined by the inner diameter of the line (inner diameter of the rings 2) in which case any increase of the upper limit frequency dictates a reduction of the line diameter. However, without exact solution of the boundary value problems, only a rough determination equation may be given for the inner diameter. Therefore, such solution proceeds from the fact that a delay line according to FIGURE 1 possesses at a certain inner diameter a bandwidth which is greater, the stronger the magnetic coupling from chamber to chamber is. The minimum amount of the line diameter is determined by the steep increase of the delay proportion of the first forward travelling partial wave at the lower limit frequency required for an operation free from interference oscillations. This dispersion characteristic can only be obtained with difficulties with regard to an undesired coupling of the line cavities over more than one octave. For this reason, it is assumed according to the invention that the average operating wave length $\lambda_m$ is approximately equal to twice the $E_{010}$ resonance wave length $\lambda_0$ of a cylinder. By this, a value of 0.3 to 0.45 of the average operating wave length results for the diameter of the delay line. Values of approximately $\lambda_m/2.61$ have proved to be especially favorable. For a band width of the first passage range of the delay line of one octave, the resonance wave length $\lambda_0$ of the coupling opening 4 (FIGURE 1) must be between the resonance wave length of the $E_{010}$ resonance of a cylinder and the average operating wave length. By means of the present invention, it was found out that the dispersion characteristic of the first forward travelling partial wave has the described form on both sides of the operating point 8 when the resonance wave length $\lambda_0$ of the longest wave length oscillation mode of a hollow space bounded by two adjacent transverse walls ($E_{010}$ resonance) is in a ratio to the resonance wave length of the coupling opening 4 and the latter, in turn, is in a ratio of the average operating wave length of 1 to $1.6 \pm 0.25$ to 2. In this case, a ratio of 1:1.6:2 has proved to be especially advantageous. From this proportion, an average slit length for the coupling openings 4 is derived which is generally equal to one-half of the slit resonance wave length and amounts to approximately 0.4 $\lambda_m$ if the above specified requirement of $\lambda_m$ as being approximately equal to $2\lambda_0$ is fulfilled.

The second passage range evident from the diagrams of the FIGURES 2 and 3 corresponds to the $EH_{11}$ wave which is based upon the $E_{110}$ resonance. But because of the coupling between the individual resonator chambers, the $HE_{11}$ wave type derived from the $H_{111}$ resonance of a cylinder exhibits also a longitudinal component $E_z$ which can couple with the electron beam. From that known nominal resonator diagram it is evident that in some cases the $H_{111}$ resonance may lie very close to the $E_{110}$ resonance. Then the passage ranges of the corresponding waves overlap one another so that especially adversely arranged conditions with regard to a self oscillation of high frequency oscillations exist. However, through an approriate selection of the ratio of the radius *a* of a resonance chamber to its height L, one can shift the $H_{111}$ resonance and thereby the corresponding wave to very high frequencies while the $EH_{11}$ wave is independent of the ratio *a/L*. Then it is always possible to separate the two mentioned higher frequency interference modes from each other according to their frequency. For practical use, value for *a/L* between $\sqrt{1.2}$ and 10 should be employed. For example, at a value *a/L* being approximately equal to $\sqrt{2.8}$ the upper limit frequency of the $EH_{11}$ wave existed at 24 gHz. and the $HE_{11}$ wave existed at 36 gHz. while the upper limit frequency of the $E_{01}$ wave (first passage range) amounted to 12.5 gHz.

Figure 4:
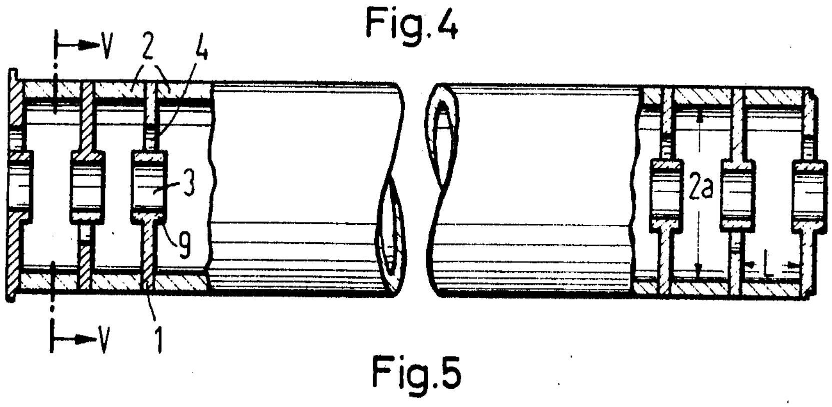
FIGURE 4 is a side elevational view, partly sectioned, of the delay line constructed in accordance with the principles of the present invention.
Figure 5:
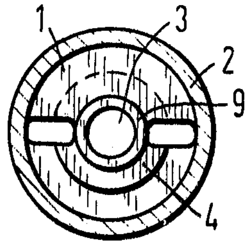
FIGURE 5 is a sectional view taken generally along line V—V of FIGURE 4.

FIGURE 4 is a side view, partially broken out and in section and FIGURE 5 is a sectional view taken generally along the line V—V of FIGURE 4 of one practical embodiment of the delay line of a travelling wave amplifier tube according to the present invention. This line includes a number of rings 2 and disks 1 of vacuum copper which are placed in contact with one another and soldered together in a vacuum tight manner by means of silver solder. The inner diameter $2a$ of this line amounts to 16 mm. The individual transverse walls 1 are respectively provided with an opening 3, centrally located in relation to the longitudinal axis of the rings 2, for the passage of an electronic beam. The inner diameter of openings 3 amounts to 5 mm. The coupling-opening 4 has the shape of a semicircular arc which, at its base, is enlarged to a slit shape extending radially towards the outside of the disk and to the inner wall of the hollow conductor formed by the rings 2. These radially extending enlargements of the openings 4 serve for receiving longitudinally extending damping bodies. The coupling openings 4 are in succeeding transverse walls or disks 1 of the hollow conductor respectively displaced from one another by 180° whereby an *L/C* ratio of the line, especially advantageous for the coupling resistance, is obtained. The width of the coupling openings 4 amounts, inclusive of the radial, slit shaped enlargements, to 2 mm. on an average while the inner radius of each semicircular coupling opening 4 equals 3.6 mm. Then the average slit length corresponding to one-half of the resonance wave length of the openings 4 amounts to approximately 20 mm. Actually, the resonance wave length of the coupling openings 4 also depends upon the depth of the openings 4. However, the influence of the depth of the coupling openings on their resonance wave length may be neglected as long as the transverse walls are relatively thin as is desired for high frequency technique reasons. In this case, the thickness of the transverse walls 1 has a value of 1.1 mm. Only in the immediate area of the electron passage openings 3, are the disks strengthened in such a manner that on both surfaces of the disks 1, a circular or cylindrical piece 9 is secured which encloses the respective electron passage opening 3 and extends coaxially therefrom. The cylindrical pieces 9 increase the gap factor. Each cylindrical piece 9 extends 1.1 mm. above the respective 1.1 mm. thick transverse wall 1. The distance L between two adjacent transverse walls 1 amounts to 5.4 mm.

The delay line shown in the FIGURES 4 and 5 with the described proportions exhibits an upper limit frequency of 12.5 gHz. The operating range exists at frequencies of 5.9 to 6.4 gHz. In this case the first forward travelling partial wave of the $E_{01}$ wave has such a dispersion characteristic that self oscillation with the basic wave is possible only at line voltages which are 10% above the highest operating voltage of the line. Beyond this, a tube employing this line may be switched on and off extremely fast, in particular through a push-button switch. Then the maximum switching time and along with it the cut off time during operating interferences is only determined by the power supply.

The invention is not restricted to the illustrated exemplification thereof. In particular, it is not necessary that the coupling openings are respectively displaced from one another by 180°. Furthermore, the delay line does not have to be rotation symmetrical, but may also have a rectangular, in particular a quadratic cross section. In a delay line having quadratic cross section, as opposed to a cylindrical delay line wherein the requirement that the inner diameter of the line is of a value of 0.3 to 0.45 of the average operating wave length, the inner circumference of the hollow conductor is approximately equal to $\sqrt{2}$ of the average operating wave length.

It should be evident that various modifications can be made to the described embodiment without departing from the scope of the present invention.

I claim:

1. A delay line of spaced structural configuration for a traveling wave amplifier tube of the higher power type in which the basic wave is backward traveling and, including localized damping structures for the suppression of interference oscillations, the improvement therein comprising means for dimensioning the dispersion characteristic with respect to the first forward traveling partial wave such that the delay proportion in the operating wave range with a phase rotation of approximately $1.05\pi$ to $1.15\pi$ at a relatively small dispersion is higher than that at the lower end upper limit frequencies, said dimensioning means including means for establishing the dispersion characteristic with respect to the first forward traveling partial wave such that the delay proportion at the lower limit frequency is substantially equal to the delay proportion at the higher limit frequency, and a rotation symmetrical hollow conductor having a plurality of transverse walls therein equal to one another and equally spaced from one another along a longitudinal axis thereof, each of said walls having an electron beam opening centrally located in relation to the longitudinal axis of said hollow conductor for the passage of an electron beam therethrough and at least one eccentric coupling opening, said dimensioning means defining the inner diameter of said conductor as having a value of 0.3 to 0.45 of the average operating wave length and the resonance wave length of the longest wave length oscillation mode of a hollow spaced defined by two adjacent transverse walls as having with respect to the resonance wave length of said coupling openings and the resonance wave length of said coupling openings as having with respect to the average operating wave length a ratio of 1 to 1.6±0.25 to 2, whereby interference oscillations with an intensity sufficient to overcharge the damping structures are devoid with respect to values of applied line voltage below the operating voltage of the line.

2. A delay line as defined in claim 1, wherein the average operating wave length is essentially equal to twice the lower limit wave length.

3. A delay line as defined in claim 2, wherein each of the coupling openings in a respective transverse wall is formed in the shape of a partially bent slit separated from a respective electron beam opening and having an average slit length amounting to approximately 0.35 to 0.45 of the average operating wave length.

4. A delay line as defined in claim 3, wherein each of the coupling openings are formed in the shape of a semicircular arc having radially extending ends extending towards a perimeter of a respective wall and wherein the coupling openings of successive walls are respectively alternately displaced from one another.

5. A delay line as defined in claim 4, including a plurality of rings each soldered between respective adjacent ones of said transverse walls.

6. A delay line as defined in claim 5, wherein the ratio of the inner radius of said hollow conductor to the distance between two adjacent transverse walls is between $\sqrt{1.2}$ and 10.

7. A delay line as defined in claim 6, wherein the inner diameter of said hollow conductor is essentially equal to 16 mm.; the distance between two adjacent transverse walls is essentially equal to 5.4 mm.; the diameter of each electron beam opening is essentially equal to 5 mm.; the inner diameter of each semicircular coupling opening is equal to 3.6 mm.; the average width of each coupling opening is equal to 2 mm.; and the thickness of each transverse wall is equal to 1.1 mm.

References Cited

UNITED STATES PATENTS

| | | |
|---|---|---|
| 3,221,204 | 11/1965 | Hant et al. |
| 3,233,139 | 2/1966 | Chodorow. |
| 3,297,906 | 1/1967 | Schumacher. |

HERMAN K. SAALBACH, Primary Examiner

T. VEZEAN, Assistant Examiner

U.S. Cl. X.R.

315—3.5

UNITED STATES PATENT OFFICE
CERTIFICATE OF CORRECTION

Patent No. 3,504,308 Dated March 31, 1970

Inventor(s) Erich Mayerhofer

It is certified that error appears in the above-identified patent and that said Letters Patent are hereby corrected as shown below:

Column 2, line 41, read "spaced to" as --spaced in--,

Column 3, line 70, read "basic wave mode" as --basic wave of the mode--

Column 5, line 43, read "From that" as --From the--,

Claim 7, column 8, line 12, read "as defined in claim 6" as --as defined in claims 4 or 5--.

Signed and sealed this 30th day of March 1971.

(SEAL)
Attest:

EDWARD M.FLETCHER,JR.
Attesting Officer

WILLIAM E. SCHUYLER, JR.
Commissioner of Patents